US012626911B2

(12) United States Patent
Hama et al.

(10) Patent No.: US 12,626,911 B2
(45) Date of Patent: May 12, 2026

(54) CATHODE MIXTURE

(71) Applicants: Shigenori Hama, Toyota (JP); Keisuke Omori, Toyota (JP); Mitsutoshi Otaki, Toyota (JP); Donghai Wang, University Park, PA (US); Atif S. Alzahrani, University Park, PA (US); Daiwei Wang, University Park, PA (US)

(72) Inventors: Shigenori Hama, Susono (JP); Keisuke Omori, Kariya (JP); Mitsutoshi Otaki, Susono (JP); Donghai Wang, State College, PA (US); Atif S. Alzahrani, Dhahran (SA); Daiwei Wang, State College, PA (US)

(73) Assignees: TOYOTA JIDOSHA KABUSHIKI KAISHA, Toyota (JP); The Penn State Research Foundation, University Park, PA (US)

( * ) Notice: Subject to any disclaimer, the term of this patent is extended or adjusted under 35 U.S.C. 154(b) by 812 days.

(21) Appl. No.: 17/806,351

(22) Filed: Jun. 10, 2022

(65) Prior Publication Data

US 2023/0402589 A1 Dec. 14, 2023

(51) Int. Cl.

| | |
|---|---|
| ***H01M 4/38*** | (2006.01) |
| ***H01M 10/36*** | (2010.01) |
| *H01M 4/02* | (2006.01) |

(52) U.S. Cl.

CPC ............. *H01M 4/38* (2013.01); *H01M 10/36* (2013.01); *H01M 2004/028* (2013.01)

(58) Field of Classification Search

CPC .. H01M 4/38; H01M 10/36; H01M 2004/028; H01M 4/5815; H01M 10/052; Y02E 60/10

See application file for complete search history.

(56) References Cited

U.S. PATENT DOCUMENTS

| | | | | |
|---|---|---|---|---|
| 2009/0162751 A1* | 6/2009 | Honbo | .............. | H01M 10/0525 429/231.95 |
| 2015/0340696 A1 | 11/2015 | Son et al. | | |

(Continued)

FOREIGN PATENT DOCUMENTS

| | | |
|---|---|---|
| CN | 102969485 A * | 3/2013 |
| JP | 2006092881 A | 4/2006 |

(Continued)

OTHER PUBLICATIONS

Catholyte Formulations for High-Energy Li—S Batteries Satyajit Phadke, Erwan Coadou, and Mérièm Anouti The Journal of Physical Chemistry Letters 2017 8 (23), 5907-5914 DOI: 10.1021/acs.jpclett.7b02936 (Year: 2017).*

(Continued)

*Primary Examiner* — Matthew T Martin
*Assistant Examiner* — Felicity B Alban
(74) *Attorney, Agent, or Firm* — Dickinson Wright, PLLC

(57) ABSTRACT

To provide a cathode mixture configured to increase the discharge capacity of a lithium secondary battery. The cathode mixture is a cathode mixture for lithium secondary batteries, comprising: a cathode active material containing an S element, and diphenyl disulfide as an additive, wherein a content of the diphenyl disulfide in the cathode mixture is less than 13.0 mass % of a total mass (100 mass %) of the cathode mixture.

3 Claims, 1 Drawing Sheet

(56) References Cited

U.S. PATENT DOCUMENTS

| | | | | |
|---|---|---|---|---|
| 2017/0133676 | A1* | 5/2017 | Kodato | H01M 10/0525 |
| 2019/0372107 | A1* | 12/2019 | Nose | H01M 10/058 |
| 2020/0203756 | A1* | 6/2020 | Kim | H01M 10/052 |
| 2021/0119210 | A1* | 4/2021 | Korzhenko | H01M 4/583 |

FOREIGN PATENT DOCUMENTS

| | | | | | |
|---|---|---|---|---|---|
| JP | 2014035944 | A | | 2/2014 | |
| JP | 2016506055 | A | | 2/2016 | |
| JP | 6390230 | B2 | * | 9/2018 | |
| WO | WO-2012111338 | A1 | * | 8/2021 | H01M 10/0525 |

OTHER PUBLICATIONS

English machine translation of WO 2012111338 A1.*
Bhargav et al. A phenyl disulfide@CNT composite cathode for rechargeable lithium batteries; Sustainable Energy Fuels (Year: 2017).*
Wang et al. Anion Intercalation of VS4 Triggers Atomic Sulfur Transfer to Organic Disulfide in Rechargeable Lithium Battery; Adv Func Materials (Year: 2021).*
English machine translation of JP6390230-B2.*
English machine translation of CN-102969485-A.*

* cited by examiner

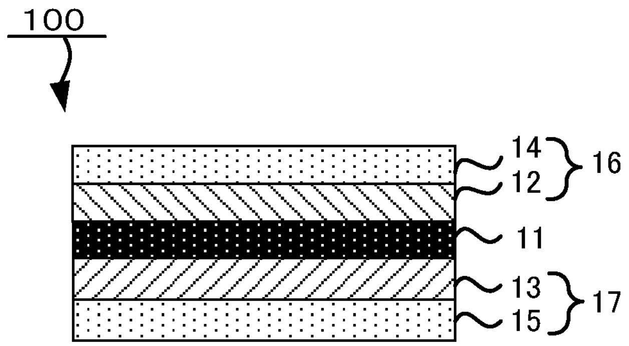
100
14
12
16
11
13
15
17

CATHODE MIXTURE

TECHNICAL FIELD

The disclosure relates to a cathode mixture.

BACKGROUND

The development of a lithium secondary battery in which sulfur is used as a cathode active material (in other words a lithium-sulfur battery) is under development. Sulfur is characterized in that the theoretical capacity is 1675 mAh/g and very high.

As a technique for enhancing the electric conductivity of the inside of an electrode, the cycle characteristics of a battery and the capacity of the battery, Patent Literature 1 discloses a sulfur-carbon composite and a cathode active material for a lithium-sulfur battery, which comprises an amphiphilic polymer comprising hydrophilicity parts and hydrophobicity parts.

Patent Literature 2 discloses a cathode material composed of an electrically conductive material and a complex of sulfur and/or a sulfur compound having a S—S bonding.

Patent Literature 3 discloses a cathode electrode comprising a current collector and a cathode active material layer containing a sulfur composite in which a sulfur surface is coated with a metal layer or a metal sulfide layer.

Patent Literature 1: Japanese Patent Application Laid-Open (JP-A) No. 2016-506055

Patent Literature 2: JP-A No. 2006-092881

Patent Literature 3: JP-A No. 2014-035944

A conventional lithium secondary battery in which sulfur is used as the cathode active material, has the following problems: components other than the cathode active material account for a large proportion of the cathode layer of the lithium secondary battery; the energy density of the cathode layer is low; and the discharge capacity of the lithium secondary battery is low.

SUMMARY

The disclosed embodiments were achieved in light of the above circumstances. An object of the disclosed embodiments is to provide a cathode mixture configured to increase the discharge capacity of a lithium secondary battery.

In a first embodiment, there is provided a cathode mixture for lithium secondary batteries, comprising:

a cathode active material containing an S element, and diphenyl disulfide as an additive, wherein a content of the diphenyl disulfide in the cathode mixture is less than 13.0 mass % of a total mass (100 mass %) of the cathode mixture.

In the cathode mixture of the disclosed embodiments, the content of the diphenyl disulfide may be 0.8 mass % or more and 3.7 mass % or less of the total mass (100 mass %) of the cathode mixture.

In another embodiment, there is provided a lithium secondary battery comprising: a cathode comprising a cathode layer containing the cathode mixture, an anode comprising an anode layer containing an anode active material, and an electrolyte layer containing an electrolyte.

According to the disclosed embodiments, a cathode mixture configured to increase the discharge capacity of a lithium secondary battery, is provided.

BRIEF DESCRIPTION OF THE DRAWING

FIG. 1 is a schematic sectional view of an example of the lithium secondary battery of the disclosed embodiments.

DETAILED DESCRIPTION

The cathode mixture of the disclosed embodiments is a cathode mixture for lithium secondary batteries, comprising:

a cathode active material containing an S element, and diphenyl disulfide as an additive, wherein a content of the diphenyl disulfide in the cathode mixture is less than 13.0 mass % of a total mass (100 mass %) of the cathode mixture.

It was found that the discharge capacity of a lithium secondary battery comprising a cathode layer containing the cathode mixture, is specifically increased by adding diphenyl disulfide, which reacts with Li during charging, to the cathode mixture.

The diphenyl disulfide represented by the following chemical formula (1) is known to react with $Li^+$, cause a ring-opening reaction and produce a substance represented by the following chemical formula (2), that is, lithium thiophenolate (LiTP). Since the LiTP has Li ion conductivity, the ion conductivity of the cathode layer is thought to be increased by reacting the Li with the diphenyl disulfide during charging of the lithium secondary battery. Accordingly, the discharge capacity of the lithium secondary battery is thought to be increased since the diphenyl disulfide is contained in the cathode layer.

(1)

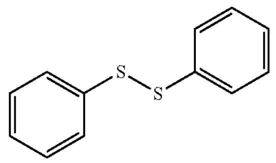

(2)

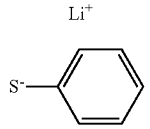

The cathode mixture contains as least a cathode active material and, as an additive, diphenyl disulfide. As needed, it may contain a solid electrolyte, a conductive additive and a binder, for example.

The cathode active material contains an S element. The cathode active material containing the S element may be selected from various kinds of materials. As the cathode active material, examples include, but are not limited to, an elemental sulfur and $Li_xS$. As the elemental sulfur, examples include, but are not limited to, $S_8$ sulfur. $S_8$ sulfur can be three types of crystal systems (i.e., α sulfur (orthorhombic sulfur), β sulfur (monoclinic sulfur) and γ sulfur (monoclinic sulfur)). The cathode active material containing the S element may be any of the crystal systems.

The form of the cathode active material is not particularly limited. As the form, examples include, but are not limited to, a particulate form and a plate form.

When the cathode active material is in a particulate form, the average particle diameter of the cathode active material particles is not particularly limited.

A cathode active material other than the cathode active material containing the S element, may be contained in the cathode active material to the extent that the above problems can be solved.

The amount of the cathode active material contained in the cathode mixture is not particularly limited, and it may be appropriately determined depending on desired battery performance. For example, the content of the cathode active material in the cathode mixture may be 10 mass % or more and 80 mass % or less. The lower limit of the content may be 15 mass %, 20 mass %, or 25 mass %. The upper limit of the content may be 70 mass % or 60 mass %. When the content of the cathode active material is too large, the ion conductivity and electron conductivity of the cathode layer of the lithium secondary battery may be insufficient.

As the additive, diphenyl disulfide is used.

The amount of the additive contained in the cathode mixture may be less than 13.0 mass % of the total mass (100 mass %) of the cathode mixture. From the viewpoint of further increasing the discharge capacity of the lithium secondary battery, it may be 0.8 mass % or more and 3.7 mass % or less. If the content of the additive is too large, the content of the cathode active material is relatively small, and there is a possibility that the cathode mixture cannot obtain sufficient energy density.

The solid electrolyte functions to increase the ion conductivity of the cathode mixture.

As the solid electrolyte, examples include, but are not limited to, materials given below as the examples of the solid electrolyte of the electrolyte layer.

The content of the solid electrolyte in the cathode mixture is not particularly limited. For example, it may be 1 mass % to 80 mass % of the total mass (100 mass %) of the cathode mixture. If the content of the solid electrolyte is too large, the content of the cathode active material is relatively small, and there is a possibility the cathode mixture cannot obtain sufficient energy density.

The conductive additive functions to increase the electron conductivity of the cathode mixture. Also, the conductive additive is supposed to function as a reducing agent for reduction of an elemental sulfur (a cathode active material) when a raw material mixture is subjected to mechanical milling, for example. In the cathode mixture, the conductive additive may be present in a dispersed state.

As the conductive additive, examples include, but are not limited to, a carbon material and a metal material. As the carbon material, examples include, but are not limited to, vapor-grown carbon fiber (VGCF), acetylene black (AB), Ketjen Black (KB), activated carbon, furnace black, carbon nanotube (CNT), carbon nanofiber (CNF) and graphene.

As the conductive additive, one or more kinds of conductive additives may be used.

The amount of the conductive additive contained in the cathode mixture is not particularly limited, and it may be appropriately determined depending on desired battery performance. For example, the content of the conductive additive in the cathode mixture may be 5 mass % or more and 50 mass % or less. The lower limit of the content may be 10 mass %. The upper limit of the content may be 40 mass %. if the content of the conductive additive is too large, the content of the cathode active material is relatively small, and there is a possibility that the cathode mixture cannot obtain sufficient energy density.

As the binder, examples include, but are not limited to, acrylonitrile-butadiene rubber (ABR), butadiene rubber (BR), polyvinylidene fluoride (PVdF) and styrene-butadiene rubber (SBR).

As the binder, one or more kinds of binders may be used.

The content of the binder in the cathode mixture is not particularly limited.

The form of the cathode mixture may be a powder form, a solid form in which particles are aggregated and/or bound to each other, or any other form. Various kinds of forms are applicable depending on the desired form of the battery, for example.

The method for producing the cathode mixture of the disclosed embodiments is not particularly limited. The cathode mixture may be produced by mixing raw materials such as the cathode active material and the additive.

The method for mixing the raw materials is not particularly limited. For example, the raw materials may be mixed by mechanical milling.

The mechanical milling is not particularly limited, as long as it is a method for mixing the raw materials by applying mechanical energy thereto. The mechanical milling may be carried out by, for example, a ball mill, a vibrating mill, a turbo mill, mechanofusion, a disk mill or the like. From the viewpoint of easier amorphization of the raw materials, a planetary ball mill may be used.

The mechanical milling may be dry mechanical milling or wet mechanical milling. Wet mechanical milling uses a liquid, and the liquid may be an aprotic liquid, for example. As the aprotic liquid, examples include, but are not limited to, a polar aprotic liquid and a non-polar aprotic liquid.

The condition of the mechanical milling is appropriately determined to obtain the desired cathode mixture. For example, in the case of using a planetary ball mill, the raw material mixture and grinding balls are put in the container of the ball mill, and the mechanical milling is carried out at a predetermined plate rotational frequency for a predetermined time. The plate rotational frequency may be 200 rpm or more, may be 300 rpm or more, or may be 500 rpm or more, for example. On the other hand, the plate rotational frequency may be 800 rpm or less or may be 600 rpm or less, for example. The mechanical milling time using the planetary ball mill may be 30 minutes or more, or may be 5 hours or more, for example. On the other hand, the mechanical milling time using the planetary ball mill may be 100 hours or less, or may be 60 hours or less, for example. The raw material for the container and grinding balls used in the planetary ball mill may be $ZrO_2$ or $Al_2O_3$, for example. The diameter of the grinding balls may be 1 mm or more and 20 mm or less, for example. The mechanical milling may be carried out in an inert gas atmosphere such as Ar gas atmosphere.

7. Lithium Secondary Battery

FIG. 1 is a schematic sectional view of an example of the lithium secondary battery of the disclosed embodiments.

As shown in FIG. 1, a lithium secondary battery 100 comprises a cathode 16 comprising a cathode layer 12 and a cathode current collector 14, an anode 17 comprising an anode layer 13 and an anode current collector 15, and an electrolyte layer 11 disposed between the cathode layer 12 and the anode layer 13.

[Cathode]

The cathode comprises at least the cathode layer. As needed, it further comprises the cathode current collector.

[Cathode Layer]

The cathode layer is composed of the above-described cathode mixture.

The thickness of the cathode layer is not particularly limited. For example, it may be 0.1 μm or more and 1000 μm or less.

The method for forming the cathode layer is not particularly limited. For example, a cathode layer slurry is produced by adding the cathode mixture powder containing the cathode active material, diphenyl disulfide and, as needed, other components to a solvent and mixing them by a homogenizer or the like; the cathode layer slurry is applied on one surface of a support such as the cathode current collector; and the applied slurry is dried, thereby forming the cathode layer.

As the solvent, examples include, but are not limited to, butyl acetate, butyl butyrate, heptane and N-methyl-2-pyrrolidone.

The method for applying the cathode layer slurry on one surface of the support such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The support may be appropriately selected from self-supporting materials. For example, a metal foil of Cu, Al or the like may be used as the support.

The cathode layer may be formed by another method such as pressure-forming the cathode mixture powder containing the cathode active material, diphenyl disulfide and, as needed, other components. In the case of pressure-forming the cathode mixture powder, generally, a press pressure of about 1 MPa or more and about 600 MPa or less is applied.

The pressure applying method is not particularly limited. As the method, examples include, but are not limited to, flat pressing, roll pressing and cold isostatic pressing (CIP).

[Cathode Current Collector]

The cathode current collector functions to collect current from the cathode layer. As the material for the cathode current collector, examples include, but are not limited to, a metal material containing at least one element selected from the group consisting of Ni, Al, Au, Pt, Fe, Ti, Co and Cr. As long as the surface of the cathode current collector is composed of the material, the inside of the cathode current collector may be composed of a material that is different from the surface.

As the form of the cathode current collector, examples include, but are not limited to, various kinds of forms such as a foil form, a plate form, a mesh form and a perforated metal form.

The cathode may further comprise a cathode lead connected to the cathode current collector.

[Anode]

The anode comprises the anode layer and the anode current collector for collection of current from the anode layer.

[Anode Layer]

The anode layer is a layer containing at least an anode active material.

As the anode active material, examples include, but are not limited to, an elemental lithium and a lithium alloy. As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. When a material containing a Li element is contained in the cathode layer, an elemental Si, a Si alloy or the like may be used as the anode active material. As the Si alloy, examples include, but are not limited to, an alloy with a metal such as Li. Also, the Si alloy may be an alloy with at least one metal selected from the group consisting of Sn, Ge and Al.

As needed, the anode layer may contain at least one of a solid electrolyte, a conductive additive and a binder. As the solid electrolyte, examples include, but are not limited to, materials given below as the examples of the solid electrolyte of the electrolyte layer. As the conductive additive and the binder, examples include, but are not limited to, the materials given above as the examples of the conductive additive and binder of the cathode mixture.

The thickness of the anode layer is not particularly limited. For example, it may be 0.1 μm or more and 1000 μm or less.

The anode layer can be easily formed by, for example, pressing the above-described anode active material, etc. Also, a foil composed of any of the above-described materials may be used as the anode layer.

[Anode Current Collector]

As the raw material for the anode current collector, examples include, but are not limited to, metal materials such as SUS, Cu, Ni, Fe, Ti, Co and Zn. As the form of the anode current collector, examples include, but are not limited to, the forms given above as the examples of the form of the cathode current collector.

[Electrolyte Layer]

The electrolyte layer contains at least an electrolyte.

As the electrolyte, examples include, but are not limited to, a non-aqueous electrolyte, a gel electrolyte and a solid electrolyte. They may be used alone or in combination of two or more kinds.

As the non-aqueous electrolyte, generally, a non-aqueous electrolyte containing a lithium salt and a non-aqueous solvent, is used.

As the lithium salt, examples include, but are not limited to, inorganic lithium salts such as $LiPF_6$, $LiBF_4$, $LiClO_4$ and $LiAsF_6$, and organic lithium salts such as $LiCF_3SO_3$, $LiN(SO_2CF_3)_2$ (Li-TFSI), $LiN(SO_2C_2F_5)_2$ and $LiC(SO_2CF_3)_3$.

As the non-aqueous solvent, examples include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof.

The concentration of the lithium salt in the non-aqueous electrolyte may be from 0.3 M to 5 M, for example.

The gel electrolyte is generally a non-aqueous electrolyte gelled by addition of a polymer.

More specifically, the gel electrolyte is obtained by gelling the above-mentioned non-aqueous electrolyte by addition of a polymer such as polyethylene oxide, polypropylene oxide, polyacrylonitrile, polyvinylidene fluoride (PVdF), polyurethane, polyacrylate and cellulose.

As the solid electrolyte (SE) contained in the electrolyte layer, examples include, but are not limited to, a sulfide-based solid electrolyte, an oxide-based solid electrolyte and a polymer electrolyte. The solid electrolyte may be a sulfide-based solid electrolyte.

The sulfide-based solid electrolyte may contain a Li element, an A element (A is at least one of P, Ge, Si, Sn, B and Al) and an S element. The sulfide-based solid electrolyte may further contain a halogen element. As the halogen element, examples include an F element, a Cl element, a Br element and an I element. The sulfide-based solid electrolyte may further contain an F element, a Cl element or a Br element. Also, the sulfide-based solid electrolyte may further contain an O element.

As the sulfide-based solid electrolyte, examples include, but are not limited to, $Li_2S—P_2S_5$, $Li_2S—P_2S_5—LiI$, $Li_2S—P_2O_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are positive numbers, and Z is any one of Ge, Zn and Ga), $Li_2S—GeS_2$, $Li_2S—SiS_2—Li_3PO_4$, $P_2S_5—Li_3PO_4—LiI$, and $Li_2S—SiS_2—Li_xMO_y$ (where x and y are positive numbers, and M is any one of P, Si, Ge, B, Al, Ga and In). The "$Li_2S—P_2S_5$" means a material composed of a raw material composition containing $Li_2S$ and $P_2S_5$, and the same applies to other solid electrolytes.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be sulfide glass, crystallized sulfide glass (glass ceramics) or a crystalline material obtained by developing a solid state reaction of the raw material composition.

The crystal state of the sulfide-based solid electrolyte can be confirmed by X-ray powder diffraction measurement using CuKα radiation, for example.

The sulfide glass can be obtained by amorphizing the raw material composition (such as a mixture of $Li_2S$ and $P_2S_5$). The raw material composition can be amorphized by mechanical milling, for example.

The glass ceramics can be obtained by heating the sulfide glass, for example.

The heating temperature is not particularly limited, and it may be a temperature higher than the crystallization temperature (Tc) of the sulfide glass, which is observed by thermal analysis measurement. In general, it is 195° C. or more. On the other hand, the upper limit of the heating temperature is not particularly limited.

The crystallization temperature (Tc) of the sulfide glass can be measured by differential thermal analysis (DTA).

The heating time is not particularly limited, as long as the desired crystallinity of the glass ceramics is obtained. For example, it is in a range of from one minute to 24 hours. More specifically, it may be in a range of from one minute to 10 hours.

The heating method is not particularly limited. For example, a firing furnace may be used.

As the oxide-based solid electrolyte, examples include, but are not limited to, $Li_{3+x}PO_{4-x}N_x$ ($1 \leq x \leq 3$) and a substance having a garnet-type crystal structure that contains a Li element, a La element, an A element (A is at least one of Zr, Nb, Ta and Al) and an O element.

The polymer electrolyte generally contains a lithium salt and a polymer.

As the lithium salt, examples include, but are not limited to, the above-described inorganic and organic lithium salts. The polymer is not particularly limited, as long as it is a polymer that can form a complex with a lithium salt. As the polymer, examples include, but are not limited to, a polyethylene oxide.

The form of the solid electrolyte is not particularly limited. As the form, examples include, but are not limited to, a particulate form and a plate form. From the viewpoint of handling, it may be a particulate form.

The average particle diameter ($D_{50}$) of the solid electrolyte particles is not particularly limited. The lower limit may be 0.5 μm or more, and the upper limit may be 2 μm or less.

In the disclosed embodiments, unless otherwise noted, the average particle diameter of the particles is a volume-based median diameter ($D_{50}$) measured by laser diffraction/scattering particle size distribution measurement. Also in the disclosed embodiments, the median diameter ($D_{50}$) of the particles is a diameter at which, when the particles are arranged in ascending order of their particle diameter, the accumulated volume of the particles is half (50%) the total volume of the particles (i.e., the volume average diameter).

As the solid electrolyte, one or more kinds of solid electrolytes may be used. In the case of using two or more kinds of solid electrolytes, they may be mixed together, or they may be formed into layers to obtain a multilayer structure.

The proportion of the solid electrolyte in the electrolyte layer is not particularly limited. For example, it may be 50 mass % or more, may be in a range of 60 mass % or more and 100 mass % or less, may be in a range of 70 mass % or more and 100 mass % or less, or may be 100 mass %.

When the electrolyte layer is a solid electrolyte layer, from the viewpoint of exerting plasticity, etc., a binder can be incorporated in the solid electrolyte layer. As the binder, examples include, but are not limited to, the materials given above as the examples of the binder used in the cathode layer. However, the content of the binder in the solid electrolyte layer may be 5 mass % or less, from the viewpoint of, for example, preventing excessive aggregation of the solid electrolyte and making it possible to form the solid electrolyte layer in which the solid electrolyte is uniformly dispersed, for the purpose of easily achieving high power output.

A separator may be used as the electrolyte layer, which is a separator that is impregnated with the above-described non-aqueous electrolyte or the like and prevents contact between the cathode layer and the anode layer.

The material for the separator is not particularly limited, as long as it is a porous film. As the material for the separator, examples include, but are not limited to, resins such as polyethylene (PE), polypropylene (PP), polyester, cellulose and polyamide. The separator may have a monolayer structure or a multilayer structure. As the separator having a multilayer structure, examples include, but are not limited to, a separator having a two-layer structure of PE/PP and a separator having a three-layer structure of PP/PE/PP or PE/PP/PE.

The separator may be a non-woven fabric such as a resin non-woven fabric and a glass fiber non-woven fabric.

The thickness of the electrolyte layer is not particularly limited. In general, it is 0.1 μm or more and 1 mm or less.

As needed, the lithium secondary battery comprises an outer casing for housing the cathode, the anode and the electrolyte layer.

The material for the outer casing is not particularly limited, as long as it is a material that is stable in electrolytes. As the material, examples include, but are not limited to, resins such as polypropylene, polyethylene and acrylic resin.

The lithium secondary battery of the disclosed embodiments may be a lithium-sulfur battery (a LiS battery) in which a material containing a sulfur element is used as the cathode active material.

As the form of the lithium secondary battery, examples include, but are not limited to, a coin form, a laminate form, a cylindrical form and a square form.

The method for producing the lithium secondary battery of the disclosed embodiments, is not particularly limited and may be a conventionally-known method.

The lithium secondary battery production method may be as follows, for example. First, the solid electrolyte layer is formed by pressure-forming a solid electrolyte material powder. Next, the cathode layer is obtained by pressure-forming the cathode mixture powder containing the cathode active material and diphenyl disulfide on one surface of the solid electrolyte layer. Then, the anode layer is obtained by pressure-forming an anode mixture powder containing an anode active material on another surface of the solid electrolyte layer, which is the opposite surface to the surface on which the cathode layer is formed. As needed, a cathode current collector and an anode current collector may be attached thereto. Accordingly, the lithium secondary battery is obtained.

In this case, the press pressure applied for pressure-forming the solid electrolyte material powder, the cathode mixture powder and the anode mixture powder, is generally about 1 MPa or more and about 600 MPa or less.

The pressing method is not particularly limited. As the pressing method, examples include, but are not limited to, those given above as the examples of the pressing method in the formation of the cathode layer.

EXAMPLES

Example 1

(Production of Cathode Mixture)

As raw materials, an elemental sulfur (a cathode active material manufactured by Kojundo Chemical Laboratory Co., Ltd.), Ketjen Black (a conductive additive) and diphenyl disulfide (an additive) were prepared.

The diphenyl disulfide was weighed to be 0.8 mass % of the total mass (100 mass %) of the cathode mixture.

The raw materials were mixed by a melt-quenching method at 160° C. for 10 hours to obtain a mixture. Then, the mixture and a $Li_2S$—$P_2S_5$-based, sulfide-based solid electrolyte were subjected to mechanical milling by use of a planetary ball mill ("P7" manufactured by FRITSCH) at a plate rotational frequency of 400 rpm for 6 hours, thereby obtaining a cathode mixture. The mass ratio of the raw materials is shown in Table 1.

(Production of Lithium Secondary Battery)

A solid electrolyte (100 mg) was put in a 1 $cm^2$ ceramics mold and pressed at a pressure of 30 bar (≈3 MPa) to obtain a solid electrolyte layer. On one side thereof, 4 mg of the cathode mixture (the weight per unit area: 4 $mg/cm^2$) was placed and pressed at a pressure of 30 bar (≈3 MPa) to produce a cathode layer. On the opposite side of the solid electrolyte layer, that is, on the side opposite to the side where the cathode layer was formed, a Li—In alloy foil serving as an anode layer was disposed, thereby obtaining an assembly of the cathode layer, solid electrolyte layer and anode layer disposed in this order. The assembly was fixed at a pressure of 2 N·m, thereby obtaining a lithium secondary battery.

Example 2

A cathode mixture and a lithium secondary battery were obtained in the same manner as Example 1, except that the diphenyl disulfide was weighed to be 3.7 mass % of the total mass (100 mass %) of the cathode mixture. The mass ratio of the raw materials is shown in Table 1.

Comparative Example 1

A cathode mixture and a lithium secondary battery were obtained in the same manner as Example 1, except that the diphenyl disulfide was not used. The mass ratio of the raw materials is shown in Table 1.

Comparative Example 2

A cathode mixture and a lithium secondary battery were obtained in the same manner as Example 1, except that the diphenyl disulfide was weighed to be 13.0 mass % of the total mass (100 mass %) of the cathode mixture. The mass ratio of the raw materials is shown in Table 1.

Comparative Example 3

A cathode mixture and a lithium secondary battery were obtained in the same manner as Example 1, except that as the additive, bis(2-nitrophenyl) disulfide represented by the following chemical formula (3) was used in place of the diphenyl disulfide. The mass ratio of the raw materials is shown in Table 1.

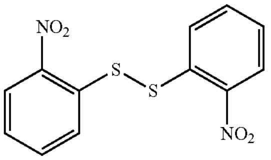
(3)

(Charge-Discharge Test)

A charge-discharge test was carried out on the lithium secondary batteries obtained in Examples 1 and 2 and Comparative Examples 1 to 3. In the charge-discharge test, each battery was charged with constant current (CC) from 0.5 V to 2.5 V at 60° C. and 0.1 C. Then, the capacity per hour was calculated from the time for which constant current was passed during the battery was discharged from 2.5 V to 0.5 V at 60° C. and 0.1 C, and the product of the current value. The sum of the capacity was divided by the sulfur mass, thereby calculating the discharge capacity of each lithium secondary battery. For each of the lithium secondary batteries of Examples 1 and 2 and Comparative Examples 2 and 3, the relative discharge capacity with respect to the discharge capacity of the lithium secondary battery of Comparative Example 1, which was determined as 100%, was calculated. The results are shown in Table 1. In Table 1, the lithium secondary battery is simply referred to as "battery".

TABLE 1

| | S (mass %) | KB (mass %) | SE (mass %) | Bis (2-nitrophenyl) disulfide (mass %) | Diphenyl disulfide (mass %) | Battery discharge capacity (mAh/g) | Relative discharge capacity (%) with respect to Comparative Example 1 |
|---|---|---|---|---|---|---|---|
| Comparative Example 1 | 38.5 | 15.4 | 46.2 | 0 | 0 | 580 | 100 |
| Comparative Example 2 | 33.3 | 13.3 | 40.3 | 0 | 13.0 | 200 | 34 |
| Comparative Example 3 | 38.2 | 15.3 | 45.8 | 0.8 | 0 | 820 | 141 |
| Example 1 | 38.2 | 15.3 | 45.8 | 0 | 0.8 | 1580 | 272 |
| Example 2 | 37.0 | 14.8 | 44.4 | 0 | 3.7 | 1100 | 190 |

From the results of Examples 1 and 2, it was confirmed that the effect of increasing the discharge capacity of the lithium secondary battery is obtained when the content of the diphenyl disulfide in the cathode mixture is from 0.8 mass % to 3.7 mass %.

The results of Comparative Example 2 show that the reaction of the diphenyl disulfide with $Li^+$ is not much quick. Accordingly, it is thought that when the content of the diphenyl disulfide in the cathode mixture is 13 mass % or more, there is an increase in the resistance of the cathode layer, and the discharge capacity of the lithium secondary battery decreases.

Initially, it was thought that the phenyl group of the diphenyl disulfide was important to increase the discharge capacity of the lithium secondary battery. However, according to the results of Comparative Example 3, the discharge capacity of the lithium secondary battery was not increased very much when the bis(2-nitrophenyl) disulfide containing a nitro group was incorporated in the cathode mixture. This is thought to be because a Li ion conductive substance is less likely to be produced since the bis(2-nitrophenyl) disulfide is less reactive with $Li^+$.

Accordingly, it was confirmed that the diphenyl disulfide has the effect of specifically increasing the discharge capacity of the lithium secondary battery.

From the above results, it was confirmed that the discharge capacity of the lithium secondary battery is considerably increased by incorporating a small amount of the diphenyl disulfide in the cathode mixture.

REFERENCE SIGNS LIST

11. Electrolyte layer
12. Cathode layer
13. Anode layer
14. Cathode current collector
15. Anode current collector
16. Cathode
17. Anode
100. Lithium secondary battery

The invention claimed is:

1. A cathode mixture for lithium secondary batteries, comprising:

a cathode active material containing an S element, and diphenyl disulfide as an additive, wherein a content of the diphenyl disulfide in the cathode mixture is 0.8 mass % or more and 3.7 mass % or less of a total mass (100 mass %) of the cathode mixture.

2. A lithium secondary battery comprising:

a cathode comprising a cathode layer containing the cathode mixture defined by claim 1, an anode comprising an anode layer containing an anode active material, and an electrolyte layer containing an electrolyte.

3. The lithium secondary battery of claim 2, having a discharge capacity of 1100 mAh/g or higher.

* * * * *